United States Patent [19]

Alsobrook et al.

[11] Patent Number: 4,691,469

[45] Date of Patent: Sep. 8, 1987

[54] FISHING TACKLE MANAGEMENT SYSTEM AND METHOD

[76] Inventors: Lawrence C. Alsobrook, 907 Terrace Acres Dr.; Norman F. Browning, 623 Forestdale Dr., both of Auburn, Ala. 36830

[21] Appl. No.: 855,470

[22] Filed: Apr. 24, 1986

[51] Int. Cl.$^4$ .............................................. A01K 97/00
[52] U.S. Cl. .................................... 43/54.1; 43/57.1; 150/52 R; 206/315.11; 224/920
[58] Field of Search ............................ 43/54.1, 57.1; 206/315.11, 466; 150/52 B, 52 R; 224/920

[56] References Cited

U.S. PATENT DOCUMENTS

| | | | |
|---|---|---|---|
| 656,655 | 8/1900 | McCurdy | 43/55 |
| 1,094,009 | 4/1914 | Parkhurst | 150/52 R |
| 1,478,497 | 12/1973 | Welch | 43/57.1 |
| 1,484,399 | 7/1922 | Kroha | 43/54.1 |
| 2,533,850 | 12/1950 | Syracuse | 150/52 R |
| 2,625,261 | 1/1953 | Swift | 43/57.1 |
| 2,723,485 | 11/1955 | Pederson | 150/52 R |
| 3,154,125 | 10/1964 | Harvey | 150/52 B |
| 3,181,751 | 5/1965 | Wilson | 224/920 |
| 4,301,898 | 11/1981 | Plough | 206/315.11 |
| 4,372,073 | 2/1983 | Goldman | 43/57.1 |
| 4,467,551 | 8/1984 | Pulver | 43/54.1 |

FOREIGN PATENT DOCUMENTS 1113773  5/1968  United Kingdom ............. 150/52 R

*Primary Examiner*—Nicholas P. Godici
*Assistant Examiner*—Carmine Cuda
*Attorney, Agent, or Firm*—Cort Flint

[57] ABSTRACT

A system and method of managing fishing tackle is disclosed wherein a number of soft pack fishing tackle units (A, B, C, D) which are customized and color coded for carrying specified fishing tackle. The individual soft pack units may be carried in a master bag (E). The soft pack units include a number of transparent pocket systems (F, G, H, I) which are customized for carrying specified fishing tackle. The pocket systems comprise customized arrangements of overlying pockets constructed from transparent plastic material in a manner that a maximum amount of fishing tackle may be stored in a highly visible arrangement. In a number of the soft pack units, an elongated pocket (24) is carried transverse to the rows of pocket systems. The elongated pocket has a longitudinal opening defined by overlapped edges of transparent plastic material having an elastic retaining band carried in the edges. The side pockets are customized for carrying containers of fishing tackle. The elastic overlapped edges provide for placement and removal of the containers in a quick and easy manner while preventing spilling of the containers when the soft pack units are unrolled and laid out for use. By providing the pocket systems in rows of individual pockets which overlie each other, maximum storage may be had and also the upper row of pockets may be utilized as a closure flap for the underlying row of pockets. In a particular embodiment, a number of overlying pockets (52, 56, 60, 66) are provided in which a number of the pockets have openings which open in opposite directions. This prevents treble hooks from becoming entangled with each other. Other customized pocket arrangements include center gussets (112) for accommodating bulk fishing tackle.

35 Claims, 12 Drawing Figures

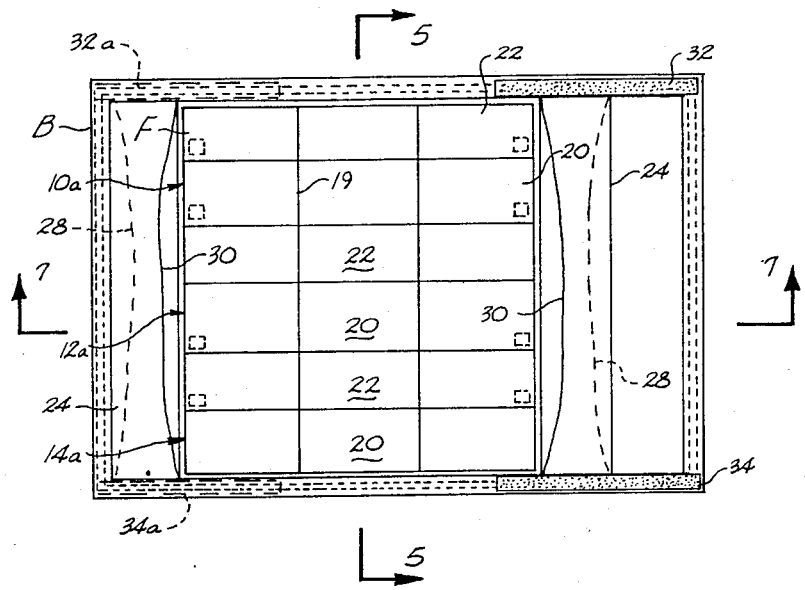
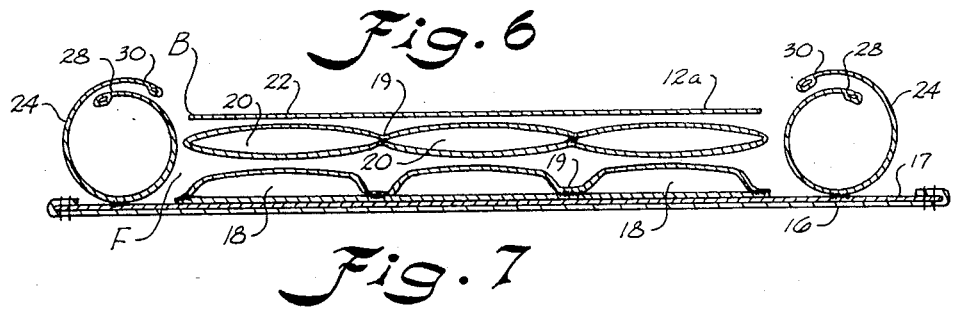
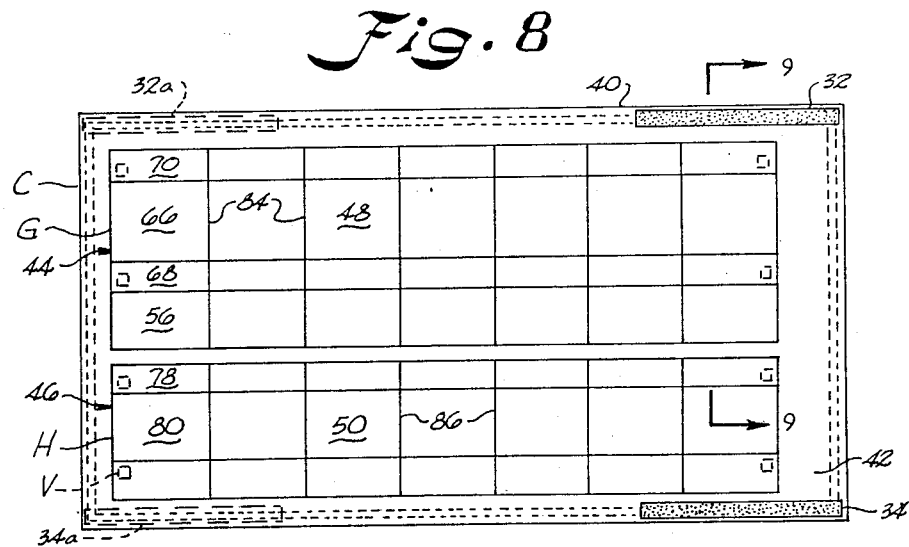

FISHING TACKLE MANAGEMENT SYSTEM AND METHOD

BACKGROUND OF THE INVENTION

The invention relates to the management and organization of fishing tackle into a system of soft pack units in a manner that use during professional tournaments and other fishing use may be had in a systematic and noisless way, and particularly suitable for travel.

Heretofore, the use of hard metal or plastic boxes for storing and utilizing fishing tackle has been the typical approach for storage. However, with the advent of professional fishing tournaments and more widespread travel for the average fisherman, the storage of fishing tackle for travel and use in a convenient and systematic manner has been a problem to which considerable attention need be given.

The prior hard type tackle boxes have been either hard plastic or stamped metal boxes with hinges and latches. An alternate fishing tackle box has been proposed which incorporates a series of slide out or fold out trays. These prior hard type tackle boxes make difficult the selection of lures, baits, and other tackle for reasons of poor access and visibility. Further, there is a lack of options for organization of the tackle within the hard box. The individual compartments of the trays normally allow room for more than one lure; however, because of tangling of hooks this presents a problem and also makes placement of more than one lure in a tray undesirable. The possible upending and noise which accompany hard boxes are problems which constantly confront every fisherman. Noise, of course, is a major concern of a fisherman.

Heretofore, fishing tackle has been packed in soft packages such as is shown in U.S. Pat. Nos. 1,736,343, and 4,467,551. While these storage devices are suitable for some fishing tackle items, they are limited in the amount and types of fishing tackle which can be accommodated.

U.S. Pat. Nos. 3,395,788 and 2,580,912 disclose tackle holders of a soft nature which may be worn by a fisherman. Once again, these tackle holders are for a very limited purpose for holding limited fishing tackle only.

While the above mentioned devices are suitable for storing and carrying limited fishing tackle only, they are not suitable for replacing entirely the hard type fishing tackle box which has been utilized in the past. The above devices are suitable mainly for being used ancillary to the hard type of fishing box.

Accordingly, an object of the invention is to provide a fishing tackle management system and method for storing and carrying a complete set of fishing tackle in an organized and noiseless manner.

Another object of the present invention is to provide an apparatus for storing fishing tackle which eliminates the problems of hinges, latches, inefficient storage and visibility, and other problems which are attendant with the use of hard, rigid tackle boxes.

Another object of the invention is to provide a system of soft packs for storing fishing tackle and from which fishing tackle may be used in a quiet manner in a boat, and in which the chances of accidental spilling of the fishing tackle is reduced.

Another object of the invention is to provide a system of storing and carrying specific items of fishing tackle in color-coded, individual, soft packs that can be easily recognized and may be fit into a soft, waterproof bag.

Still another object of the invention is to provide a soft pack fishing tackle storage device in which fishing tackle can be stored and utilized from highly visible transparent pockets which are arranged to store large numbers of lures and other fishing tackle.

Still another object of the invention is to provide individual soft pack fishing tackle storage devices which are customized for carrying certain fishing tackle, and which include specially designed, see-through pockets for carrying the various fishing tackle items from which the fishing tackle may not easily be spilled.

Another object of the invention is to provide a soft pack storage device for fishing tackle which may be placed on the floor of a boat without making noise or without spilling the fishing tackle.

Another object of the invention is to provide an apparatus for storing fishing tackle in soft packs which protects the fishing tackle in the case of accidental steppage on the soft pack.

SUMMARY OF THE INVENTION

The above objectives are accomplished by providing a system of soft customized pack units in which fishing tackle is stored and carried for use in fishing. Each individual soft fishing tackle pack is customized and color-coded and may be rolled up and fit into a master waterproof bag. With the soft pack unrolled, the tackle needed is visible and easily accessed from transparent compartments. In use, the flat design of the unrolled pack hugs the deck of a boat. The color of each pack indicates what type fishing tackle is carried in the pack. Each pack is tailored to fit the needs of storing a certain type of fishing tackle. Each soft pack includes a series of specially designed transparent pockets. The pockets are arranged to maximize the amount of storage space and the convenient use of the fishing tackle stored therein. Elongated side pockets are provided for storing jar items such as containers of pork rind. The side pockets include overlapping panels of transparent material whose edges are elasticly retained in an overlapping configuration to retain the jars. In use, the elastic edges may be easily separated for removing a jar. Velcro is utilized to cover the individual pockets so that the pockets may be opened and closed conveniently and rapidly during use. The soft fishing tackle pack units are quiet when placed on the floor of a boat, protect fishing tackle during accidental stepping on the soft pack, and afford visibility for quick and easy selection of fishing tackle.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 6 is a top plan view illustrating another embodiment of a soft fishing tackle pack in accordance with the invention;

FIG. 7 is a sectional view taken along line 7—7 of FIG. 6;

FIG. 8 is a top plan view of another soft fishing tackle pack constructed in accordance with the present invention;

DESCRIPTION OF A PREFERRED EMBODIMENT

Figure 1:
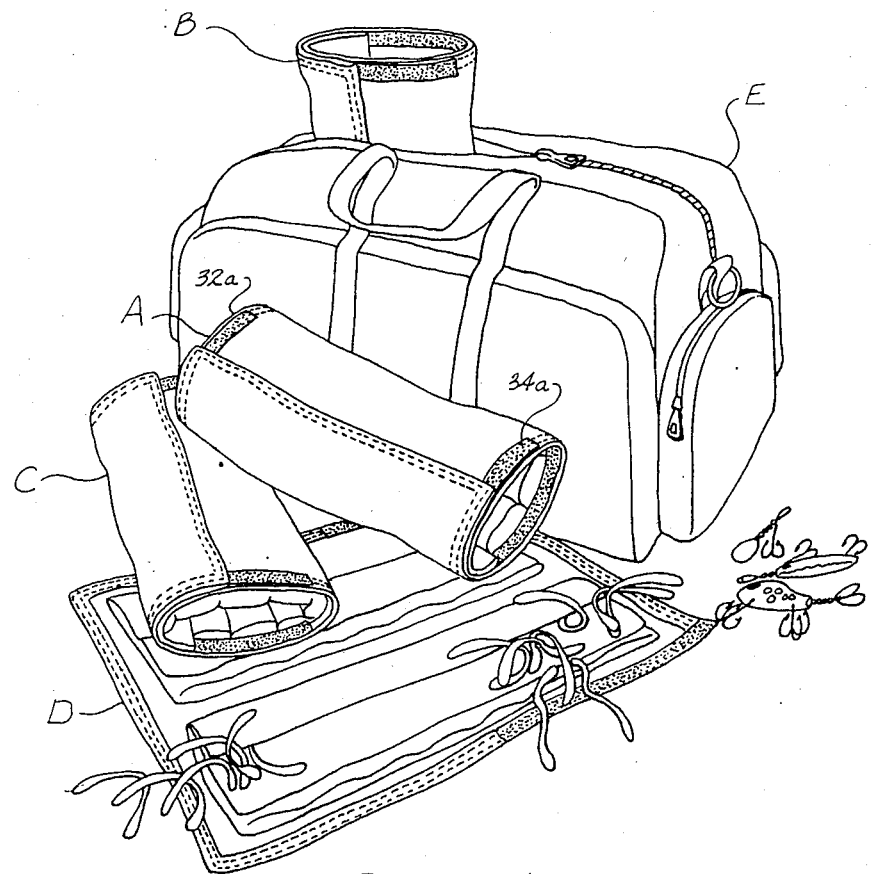
FIG. 1 is a perspective view illustrating a fishing tackle management system for organizing and storing fishing tackle according to the invention.

Referring now in more detail to the drawings, FIG. 1 illustrates a system for organizing and storing fishing tackle which includes a number of individual customized soft fishing tackle pack units A,B,C,D for storing prescribed tackle items which may be rolled up and carried in a master waterproof bag E.

Figure 2:
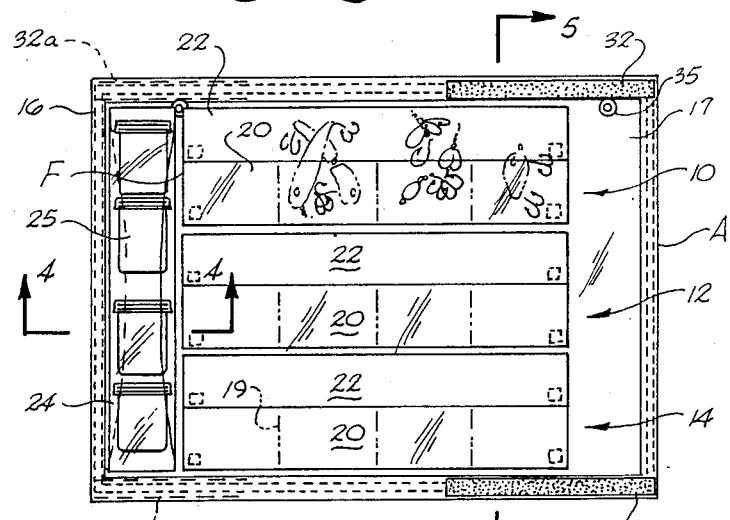
FIG. 2 is a top plan view of a soft fishing tackle pack constructed in accordance with the invention.

As can be seen in FIG. 2, the soft fishing tackle pack unit A is constructed for storing and organizing spinner baits. The soft pack A includes a plurality of rows designated at 10, 12, 14 of transparent compartment means F which may be identical. The soft pack includes a cover of nylon fabric 16 onto which the pockets are secured in any suitable manner. In a preferred embodiment, a plastic base sheet 17 is stitched to cover 16, and the compartments are formed of plastic thermally bound to base 17. Each row of compartment means includes a plurality of pockets which overlie each other defined by thermally binding sides 19 of the pockets.

Figure 5:
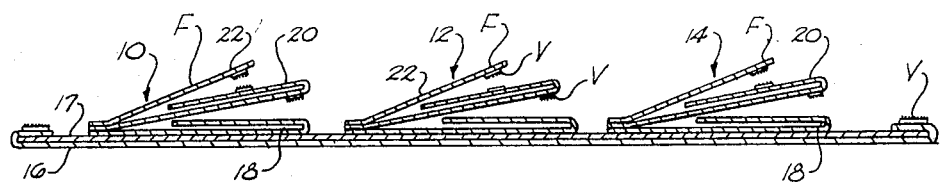
FIG. 5 is a sectional view taken along line 5—5 of FIG. 2.

As can best be seen in FIG. 5, each row of compartment means includes a bottom pocket 18, a top pocket 20, and an overlying flap 22, all of which are formed from transparent plastic. The top pocket 20 serves as a flap closure for bottom pocket 18. Flap 22 closes pocket 20. Velcro is provided at V in a suitable manner for fastening the flap closures. As is customary, the Velcro V includes a piece of hook fabric affixed onto one of the mating surfaces and a piece of pile or loop fabric affixed on the opposing mating surfaces.

Figure 3:
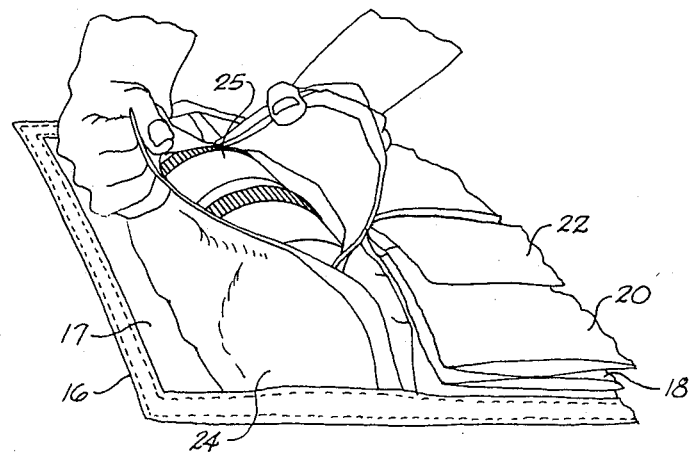
FIG. 3 is a partial perspective view illustrating a transparent side pocket for storing fishing tackle jars in a soft fishing tackle pack according to the invention.
Figure 4:
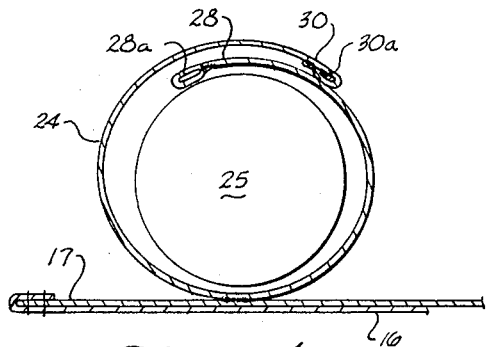
FIG. 4 is a sectional view taken along line 4—4 of FIG. 2.

As can best be seen in FIGS. 2, 3, and 4, there is an elongated, transparent side pocket 24 for storing and organizing round, cylindrical containers of fishing tackle such as jars of pork rind or fish eggs. Side pocket 24 consists of a sheet of transparent plastic material whose edges overlap. Side pocket 24 is thermally bound to base plastic sheet 17 and the ends of side pocket 24 are stitched underneath nylon cover 16. Overlapping edges 28 and 30 of side pocket 24 contain the jars 25. The selvages of the overlapped edges 28 and 30 include elastic bands 28a and 30a which are sewn or affixed onto the selvages. The elastic bands retain the jars and also facilitate removal of the jars by quick spreading apart of the overlapped edges 28 and 30. In this manner, the jars may be retained in the soft pack unit while the soft pack is unrolled for use. The jars may be easily removed from the side pocket.

Velcro strips 32 and 34 mate with complementary strips 32a and 34a to secure the soft packs A in a rolled or folded configuration, as can best be seen in FIG. 1. Grommets 35 may be provided for hanging the unrolled pack up.

Referring now in more detail to FIGS. 6 through 7, an embodiment of a soft fishing tackle pack unit B will now be described which is customized for storing and organizing fishing jigs.

Jigs are a popular type of fishing tackle which typically include a lead head and a hair or rubber skirt trailing from the lead head. In use, pork rind is typically fastened to the hook to form a trailing tail. Soft fishing tackle pack B includes a pair of elongated side pockets 24 which may have a construction like the side pockets 24 described in reference to FIG. 2. Elongated side pockets 24 contain or store a plurality of jars 25 of bait such as pork rind.

Soft pack B includes three rows designated at 10a, 12a, and 14a of transparent compartment means F (FIGS. 6 and 7). The transparent compartment means of soft pack B are identical in their construction and arrangement to the transparent compartment means of soft pack A. However, in the soft pack B there are only three sets of pockets in each row of compartments, each of which includes two pockets 18 and 20 and closure flap 22. In soft pack A there are four sets of pockets in each compartment means of each row.

As can best be seen in FIG. 7 the arrangement of the three sets of pocket systems in each row can best be seen. There is a first pocket system which includes bottom pocket 18, top pocket 20, and top flap 22. There are two more such sets of pockets to the right of the first set of pockets which includes like pockets 18, 20, and flap 22, all closed by Velcro fasteners.

Figure 9:
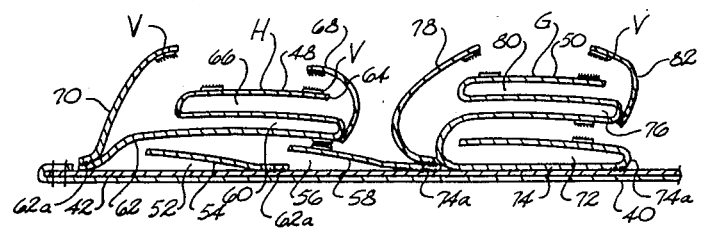
FIG. 9 is a sectional view taken through line 9—9 of FIG. 8.

Referring now to FIGS. 8 and 9, a description of soft fishing tackle pack unit C will now be set forth which is customized for crank baits. Soft fishing tackle pack C includes a cover of nylon fabric 40. There is a sheet of base plastic material 42 stitched to and made integral with the nylon cover 40. There is Velcro material 32 and 34 affixed to the inside of the soft pack and complementary Velcro material 32a and 34a affixed to the exterior surface of the soft pack.

Soft fishing tackle pack C is constructed to store and utilize fishing lures of the type commonly referred to as crank baits, wobblers, and semi-rigid fishing lures having a single or a plurality of hooks suspended therefrom. Typically such fishing lures are stored in the trays of hard fishing tackle boxes. In accordance with the present invention, these fishing lures are stored in a system of customized designed transparent compartment means G and H pocket sets.

In the soft fishing tackle pack C there are basically two rows of compartment means G and H (FIG. 8). There is a first row designated at 44 and a second row 46. First compartment means G includes seven sets of individual compartmentalized pockets 48. Second compartment means H includes seven individual sets of compartmentalized pockets 50. Since each individual set of pockets 48 is identical, only one such set of pockets will be described as illustrated.

As can best be seen in FIG. 9, the pocket set system 48 consists of a first pocket 52 formed by a piece of transparent plastic 54 thermally bound to base plastic 42. There is a second pocket 56 formed by a second piece of plastic 58 thermally bound to plastic base 42. There is a third pocket 60 formed by a piece of plastic 62 thermally bound at 62a to plastic base 42. Sheet 62 is folded upon itself to define pocket 60 and terminates at 64 to form a fourth pocket 66. There is a flap 68 for closing pocket 66. There is a flap 70 for closing pocket 60. The plastic material 62 of pocket 60 forms a closure for first and second pockets 52 and 56. Suitable Velcro V is placed as needed to form closures for the flaps.

It will be noted that pockets 60 and 66 open in opposing directions. This prevents entanglement of the treble hooks of plugs stored in the pockets as would tend to happen if the plugs slip out of pockets opened in the same direction.

The second compartment means G includes individual pocket systems 50 which will now be described, as can best be seen in FIG. 9. There is a first pocket 72 formed by a piece of plastic 74 which is thermally bound along the top and bottom of row 46 to the plastic sheet 42 at 74a. The plastic piece 74, after making pocket 72, wraps over pocket 72 and forms a second pocket 76. There is a flap 78 thermally bound to plastic material 42 at 74a which closes pocket 76. There is a third pocket 80 formed by the same piece of plastic material 74. There is a flap 82 thermally bound to plastic material 74 which closes pocket 80. Suitable Velcro V is provided to maintain the various pocket configurations and to close and seal the various flaps and pockets upon each other. Pockets 76 and 80 open in opposing directions to prevent treble hook entanglement.

It is to be understood, that individual pocket systems 48 and 50 are formed by thermally sealing the side edges of the individual pockets at 84 and 86, respectively, across the width of each row of compartment means G and H. Bottom pockets 52, 56 have eight side welds to base plastic 42. Plastic sheets are horizontally welded across base plastic 42 at 62a. Compartment means G has the outside edges of pockets 72 welded to base 42. The pocket sides of pockets 72 inbetween the side edges are welded but not to base sheet 42. While the individual pockets are formed by thermally binding the plastic material along the sides of the pockets, the individual flaps 70, 68, 78, and 82 extend continuously across the pocket sets.

Referring now to the drawings, soft fishing tackle pack unit D will now be described in more detail by reference to the drawings. Soft pack D is customized to contain and organize plastic fishing worms. Soft pack D includes a cover of nylon fabric 90 and a sheet of base plastic material 92 made integral therewith by stitching 94 on an interior side of the pack. Suitable Velcro is provided at 32 and 34 as described previously.

Figure 10:
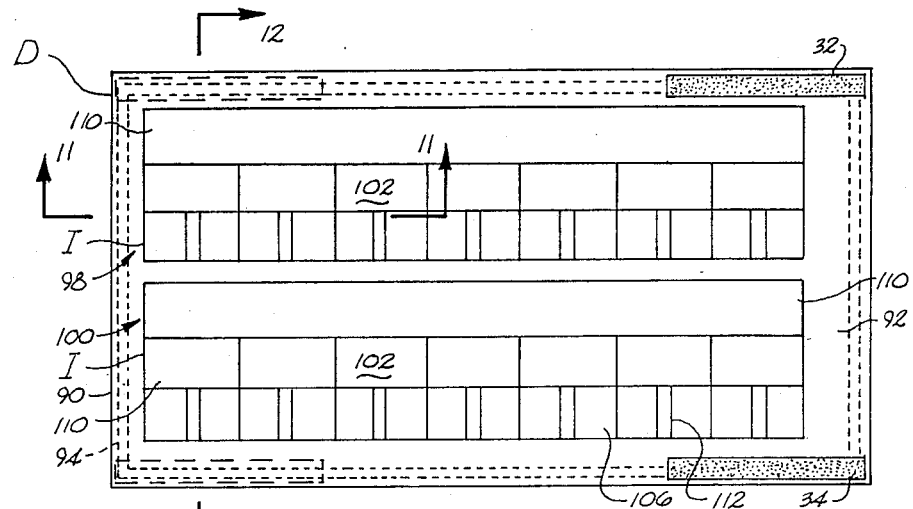
FIG. 10 is a top plan view of another soft fishing tackle pack constructed in accordance with the invention.
Figure 11:
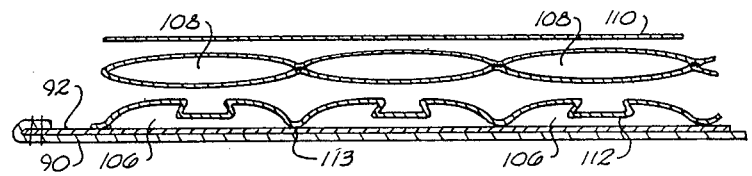
FIG. 11 is a sectional view taken through line 11—11 of FIG. 10.
Figure 12:
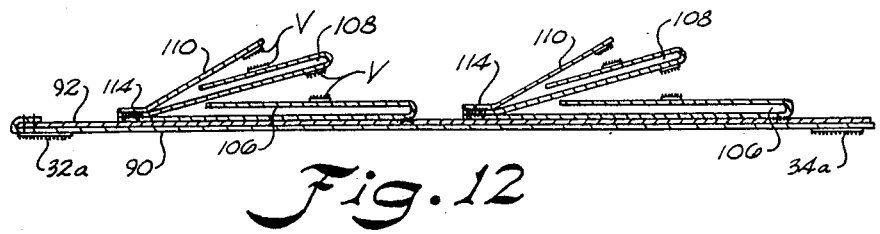
FIG. 12 is a sectional view taken along line 12—12 of FIG. 10.

As can best be seen in FIGS. 10 through 12, soft pack D includes two identical rows designated at 98, 100 of compartment means I. Each compartment means includes a plurality of pocket systems 102.

Each pocket system 102 of pocket row 98 includes a first transparent pocket 106 and a top pocket 108. There is a flap 110 which covers top pocket 108. The top pocket 108 provides a flap for bottom pocket 106. The bottom pocket 106 is made with a center gusset 112 of excess material. This center gusset provides for the pocket to expand to accommodate the bulk of plastic worms which occurs when a large package of the worms are placed in the pocket. Also for this purpose, bottom pocket 106 is extended in length relative to top pocket 108. Top pocket 108 may be utilized to store and organize fishing hooks used with the worms or lead weights. If desired, top pockets 108 may also be utilized to store smaller quantities or smaller sized plastic worms.

As described above, the individual pocket systems flap 110 is continuous across the openings of top pockets 108. As described previously, the individual pocket systems 102 are formed by thermally binding the sides of the pockets 106 at 113 to base plastic material 92 at eight marginal locations. Sides of pockets 108 are thermally bound to define the pockets, but are not welded to base plastic 92. The tops of pockets 106, 108 are horizontally welded at 114. In this manner, the row of pockets 108 are hinged and provide a flap closure for gusseted pockets 106. Velcro V may be affixed as needed to secure the closure flaps. Bottom pockets 106 are welded horizontally along their bottom edges to the base plastic sheet 92. In the illustrated embodiment, there are seven such individual pocket systems 102 formed across the compartmentalized row 98 at the top of the soft pack, and across row 100 at the bottom of the soft pack.

In accordance with the invention, a method of storing and carrying fishing tackle is disclosed wherein the tackle is highly visible for selection, and yet is stored in a relatively noiseless manner for use while fishing. The method comprises providing a plurality of soft fishing tackle pack units. Each unit is customized to store and carry a specified fishing tackle item. A cover is provided having an exterior and an interior side, and a plurality of customized rows of fishing tackle compartments are provided on the interior of the cover. Each fishing tackle compartment row is provided by a number of pocket systems wherein each pocket system comprises a number of overlying transparent tackle storage pockets maximizing the amount of tackle which may be visibly stored. By providing the pockets in this manner, the overlying pockets may serve as closure flaps for the underlying pockets and the prescribed fishing tackle in the pockets may be easily seen due to the transparency of the pocket. The uppermost pocket is provided with a single flap for closing the pocket. In an advantageous embodiment, the pockets are provided with openings in opposite directions whereby fishing hooks attached to fishing plugs and the like may not have the chance to become entangled. Preferably, each soft pack unit is constructed by stitching a plastic base sheet to the cover and thermally binding the different arrangement of plastic sheets to the base plastic to form the compartment rows and the pocket systems in each pocket compartment row.

The terms thermally binding or welding include thermal impulse or radio frequency welding. Of course, other means of adjoining the various material sections to define pockets and make attachment may be utilized such as sewing and adhesives.

While a preferred embodiment of the invention has been described using specific terms, such description is for illustrative purposes only, and it is to be understood that changes and variations may be made without departing from the spirit or scope of the following claims.

We claim:
1. A fishing tackle management system for storing and carrying fishing tackle comprising:
    a plurality of individual soft fishing tackle pack units;

each soft tackle pack unit having a customized design and construction for storing and carrying prescribed fishing tackle;

each customized soft pack unit including:

an outer fabric layer providing a cover having a finished flat configuration, a plurality of rows of transparent pocket systems arranged vertically spaced on an interior of said cover with a number of said pocket systems included in each row horizontally spaced across said cover, each pocket system comprising a plurality of overlying transparent pockets customized for storing prescribed tackle, said pockets lying over one another in a superposed manner when said cover is laid out in said flat configuration, said pockets having openings for placement and removal of fishing tackle; and each pocket system comprising a flap with closure means for closing the openings for each transparent overlying pocket in said pocket system and each overlying pocket closing the opening of each underlying pocket; and unit fastening means for securing said soft pack unit in a compact folded or rolled configuration with said fishing tackle stored therein.

2. The system of claim 1 wherein a number of said pocket systems comprise transparent pockets having opposite openings which open in opposite directions and closure means for closing respective opposite openings of said pockets in a manner that said each pocket opening is provided with an individual flap closure.

3. The system of claim 1 including a soft master bag in which said individual soft fishing tackle pack units may be carried in said compact folded configuration.

4. The system of claim 1 wherein each of said soft fishing tackle pack units are color coded to indicate specific fishing tackle stored and carried in each said color unit.

5. The system of claim 1 wherein a number of said customized soft tackle pack units include a single elongated continuous transparent side pocket extending transverse to said rows of individual pocket systems, and said elongated said compartment having an opening extending the length of said elongated said pocket facilitating storage and utilization of jar type tackle containers.

6. The system of claim 2 wherein said side pocket includes overlapping edges of transparent plastic material with the space between the edges of said plastic material defining said longitidunal opening.

7. The system of claim 6 wherein said overlapping edges of said plastic material include a longitudinal elastic band extending the length of said longitudinal opening in a manner that said elastic bands act to retain said containers within said side pocket while permitting opening of said space between said overlapping edges to facilitate removal of said containers in a quick and convenient way.

8. The system of claim 1 wherein a number of said pocket systems include pockets having a gusset which allows for expansion of said pockets to accommodate bulk fishing tackle.

9. The system of claim 8 wherein said gussets are formed in the center of said pockets and said pockets have edges which are bound to said interior surface of said cover.

10. The system of claim 1 wherein each pocket system comprises a first transparent pocket; and a second transparent pocket overlying said first transparent pocket, said second transparent pocket providing a closure flap for said first transparent pocket; and a closure flap for closing the opening of said second transparent pocket.

11. The system of claim 10 wherein said first transparent pocket extends beyond an end of said second transparent pocket so that an extended elongated pocket is provided by said first transparent pocket.

12. A soft fishing tackle soft pack unit for storing and carrying fishing tackle in a compact noiseless manner comprising:

a fabric cover having a finished flat configuration with an exterior side and an interior side for storing and carrying said fishing tackle:

a plurality of vertically spaced rows of individual transparent tackle compartment means affixed to said interior side of said fabric cover;

said transparent tackle compartment means including a plurality of transparent pocket sets horizontally spaced across said cover interior with a top pocket overlying a bottom pocket in each pocket set;

flap means carried by said cover extending horizontally across said rows for closing the openings of said transparent top pockets and wherein said top pocket overlies said bottom pocket when said cover is in said flat configuration and provides a closure flap for said bottom pocket; and unit fastening means for securing said cover in a compact rolled or folded configuration with said fishing tackle stored and carried therein.

13. The apparatus of claim 12 wherein said bottom pocket extends beyond an end of said top pocket, and said flap closure means includes said top pocket providing a flap closure for said bottom pocket, and a second flap closure extending across the length of said row of transparent compartment means for closing said top pocket.

14. The apparatus of claim 12 wherein a number of said compartment means include overlying transparent pockets having opposite openings which are disposed in opposing directions and flap means for closing each of said opposite pocket openings individually.

15. The apparatus of claim 12 wherein said rows of compartment means extend horizontally across said tackle pack unit when opened for utilization and said rows are arranged in successive vertical spaced rows in said soft pack when opened for utilization.

16. The apparatus of claim 15 wherein said flap means are transparent.

17. The apparatus of claim 12 including an elongated transparent side pocket carried by said cover interior extending transverse to said rows of individual compartments; and said side pocket having a longitudinal opening extending the length of said side pocket facilitating the placement and removal of containers of fishing tackle.

18. The apparatus of claim 17 wherein said elongated side pocket is constructed from transparent plastic material having overlapped edges between which longitudinal opening is defined.

19. The apparatus of claim 17 including elastic means carried in the outer most edges of said overlapping edges of said plastic material facilitating opening and closing of said longitudinal opening in a manner that said containers are held in said side pocket for storage while easy removal of said containers is permitted.

20. The apparatus of claim 12 wherein a number of said compartment means include transparent pockets which include a gusset for accommodating placement of bulk tackle material in said pockets.

21. The apparatus of claim 20 wherein said gussets are formed in a medial portion of said pockets with side edges of said pockets being integrally adjoined to said cover interior.

22. The apparatus of claim 12 wherein said invidual compartment means include a number of pocket sets arranged in said rows each of which includes:
   first and second bottom pockets lying in a common plane carried by said cover interior;
   a third pocket overlying said first and second bottom pockets; and
   a fourth pocket overlying said third pocket.

23. The apparatus of claim 22 wherein said first, second, and third pockets have openings which open from a first direction; and said fourth pocket has an opening which opens from a direction opposite of said first direction; and
   flap means for closing said first and second pockets, and second flap means for closing said third pocket and third flap means for closing said fourth pocket.

24. The apparatus of claim 12 wherein said compartment means include a number of pocket sets arranged in said rows each of which includes:
   a first pocket carried by said cover interior;
   a second pocket overlying said first pocket; and
   a third pocket overlying said second pocket.

25. The apparatus of claim 24 wherein said second and third pockets have openings which open in opposing directions; and flap closure means individually covering each of said openings of said second and third pockets.

26. The apparatus of claim 25 wherein said second pocket forms a closure flap for said first pocket.

27. The apparatus of claim 12 including:
   a sheet of plastic base material generally coextending with said cover interior;
   said tackle compartment means being defined by individual transparent pockets individualized by having their sides thermally bonded; and
   a number of said individual pockets within each said row having their sides thermally bonded to said base plastic material.

28. The apparatus of claim 27 wherein said compartment means includes a second row of pockets overlying said first row of pockets bonded to said base plastic material, said second row of pockets being bonded to said been plastic material along a line about which said second row of pockets are hinged to said base.

29. A method of making a tackle carrier for storing and carrying fishing tackle comprising:
   providing a plurality of individual soft fishing tackle pack units:
   customizing each one of said soft tackle pack units for storing and carrying specified fishing tackle;
   providing a cover having an exterior and an interior;
   arranging a plurality of customized tackle compartment rows on said interior of said cover wherein each compartment row includes a plurality of transparent pocket sets for storing said fishing tackle in each compartment row;
   arranging a transparent first pocket and a second transparent pocket overlying at least a portion of said first pocket in a superposed relation in each pocket set when said cover is unfoleded in a flat configuration for selection of fishing tackle from openings in said first and second pockets in the compartment rows forming a closure flap extending over each of said compartment rows with fasteners for closing said openings of said second, overlying pockets with the second, overlying pockets closing the openings of said first underlying pockets in said pocket sets; and
   fastening said cover in a folded, compact configuration for said fishing tackle stored in said individual pockets for storing said tackle.

30. The method of claim 29 comprising thermally binding said compartment rows to divide said compartment rows into individual pocket sets.

31. Method of claim 29 wherein said pockets are formed by affixing a sheet of base plastic material on the interior side of said cover; and
   thermally binding said rows of individual tackle compartments to said base plastic material.

32. The method of claim 31 wherein a number of said individual pockets have openings opening from opposite directions so that individual flaps may be accommodated over each opening of said pockets.

33. The method of claim 32 including providing attachment means for attaching each overlying pockets to one another in a manner that a superposed pocket provides a cover flap for the underlying pocket.

34. A fishing tackle management unit comprising:
   a cover;
   plastic base sheet fixed to said cover;
   a plurality of vertically spaced rows having transparent compartment means extending horizontally across said base sheet constructed from a flexible plastic material;
   individual pocket means customized for specified fishing tackle included in said compartment means created by thermally binding said flexible plastic material along lines corresponding to sides of said individual pocket means;
   a first plurality of said pocket means having at least some of said thermally bound sides also thermally bound to said plastic base sheet;
   a second plurality of said pocket means having thermally bound sides which are not bound with said base sheet, said second plurality of pocket means being thermally bound to said plastic base sheet along a horizontal line generally perpendicular to the sides in a manner that said second, plurality of pocket means is hinged to said plastic base sheet, and pivots to cover and uncover said first plurality of pocket means to selectively provide access to said first plurality of pocket means. and flap closure means having an upper marginal edge thermally bound along a line parallel to said horizontal line in a manner that a remainder of said flap closure means coextends over said first and second plurality of pocket means for securing fishing tackle therein.

35. The fishing tackle unit of claim 34 including an elongated side pocket carried transverse to said rows of compartment means having a longitudinal opening which may be elasticly opened and closed for storing and carrying containers of fishing tackle.

* * * * *